US012221336B2

(12) United States Patent
Van Keken

(10) Patent No.: US 12,221,336 B2
(45) Date of Patent: Feb. 11, 2025

(54) SADDLE AND USE OF SAID SADDLE FOR SEATING A RIDER ON AN ANIMAL, IN PARTICULAR ON A HORSE

(71) Applicant: Equiwave Flex IP B.V., Maarssen (NL)

(72) Inventor: Theodorus Jozef Maria Van Keken, Voorst (NL)

(73) Assignee: EQUIWAVE FLEX IP B.V., Maarssen (NL)

( * ) Notice: Subject to any disclaimer, the term of this patent is extended or adjusted under 35 U.S.C. 154(b) by 134 days.

(21) Appl. No.: 18/033,881

(22) PCT Filed: Oct. 26, 2021

(86) PCT No.: PCT/NL2021/050653
§ 371 (c)(1),
(2) Date: Apr. 26, 2023

(87) PCT Pub. No.: WO2022/093020
PCT Pub. Date: May 5, 2022

(65) Prior Publication Data
US 2023/0391608 A1 Dec. 7, 2023

(30) Foreign Application Priority Data
Oct. 26, 2020 (NL) ...................................... 2026766

(51) Int. Cl.
*B68C 1/02* (2006.01)

(52) U.S. Cl.
CPC .................................... *B68C 1/025* (2013.01)

(58) Field of Classification Search
CPC .............. B68C 1/025; B68C 2001/022; B68C 2001/042; B68C 2001/044;
(Continued)

(56) References Cited

U.S. PATENT DOCUMENTS 383,821 A * 5/1888 Morrow .................... B68C 1/12 54/66
6,708,471 B1 3/2004 Van Keken

FOREIGN PATENT DOCUMENTS

DE 723068 C 7/1942
DE 102015007910 A1 * 12/2016
(Continued)

OTHER PUBLICATIONS

Netherlands Search Report from corresponding NL Patent Application No. NL2026766, Jul. 8, 2021.
(Continued)

*Primary Examiner* — Magdalena Topolski
*Assistant Examiner* — Brook Victoria Schmid
(74) *Attorney, Agent, or Firm* — Workman Nydegger

(57) ABSTRACT

A saddle and use of said saddle are provided for seating a rider on an animal, in particular on a horse. The saddle includes a frame for mounting a girth and/or stirrups. The frame includes a front member that defines a pommel side of the saddle, a rear member that defines a cantle side of the saddle and a central member interconnecting the front member and the rear member. The central member is arranged to extend in a longitudinal direction above the spine of the animal. The saddle further comprises cushion members arranged for resting directly on the back of the animal on opposite sides of the central member. The saddle is provided with a connecting element crossing the central member and interconnecting the cushion members, and the connecting element is freely movable or loose with respect to the central member.

17 Claims, 5 Drawing Sheets

(58) Field of Classification Search
CPC ........ B68C 2001/046; B68C 2001/048; B68C 1/02; B68C 1/04; B68C 1/08; B68C 1/10; B68C 1/12
See application file for complete search history.

(56) References Cited

FOREIGN PATENT DOCUMENTS

| | | | |
|---|---|---|---|
| NL | 1008736 | C2 | 10/1999 |
| NL | 1035211 | C2 | 9/2009 |

OTHER PUBLICATIONS

International Search Report from corresponding PCT Patent Application No. PCT/NL2021/050653, Jan. 4, 2022.

* cited by examiner

SADDLE AND USE OF SAID SADDLE FOR SEATING A RIDER ON AN ANIMAL, IN PARTICULAR ON A HORSE

BACKGROUND

The invention relates to a saddle and the use of said saddle base for seating a rider on an animal, in particular on a horse.

NL 1008736 C2 discloses a riding saddle having a first side frame member, a second side frame member which are joined at their respective proximal and distal ends to create a sitting area for the rider such that the rider can sit, via a seating element, directly on the back of the horse between the side frame members. Hence, the frame exerts less pressure directly on the back of the horse in comparison with conventional saddle trees.

SUMMARY OF THE INVENTION

A disadvantage of the known riding saddle is that, in the field of horse riding saddles, it may not fit comfortably to horses with relatively wide shoulders and/or relatively high withers. In particular, the side frame members may come in contact with the horse and cause discomfort or even injuries. Hence, the range of horses to which the known riding saddle can be fitted is restricted.

Moreover, the seating element is located in a seating area that is bound in the lateral direction by the side frame members and in the longitudinal direction by the front and rear frame members. Hence, both the length and the width of the seating element is restricted by the frame, thereby reducing the stability of the known riding saddle on the horse.

It is an object of the present invention to provide a saddle and use of said saddle for seating a rider on an animal, in particular on a horse, wherein the comfort of the animal and/or the fitting of the saddle can be improved.

According to a first aspect, the invention provides a saddle for seating a rider on an animal, in particular on a horse, wherein the saddle comprises a frame for mounting a girth and/or stirrups, wherein the frame comprises a front member that defines a pommel side of the saddle, a rear member that defines a cantle side of the saddle and a central member interconnecting the front member and the rear member, wherein the central member is arranged to extend in a longitudinal direction above the spine of the animal, wherein the saddle further comprises a first cushion member and a second cushion member arranged for resting directly on the back of the animal on opposite sides of the central member in a lateral direction perpendicular to the longitudinal direction, wherein the saddle is provided with a connecting element crossing the central member and interconnecting the first cushion member and the second cushion member, wherein the connecting element is freely movable and/or loose with respect to the central member, wherein the saddle further comprises a seat for placement on top of the first cushion member and the second cushion member, wherein the first cushion member and the second cushion member, when resting on the back of the animal, are arranged for supporting the seat in a position above and/or clear off the central member.

In an ideal situation, the saddle according to the present invention would only consist of the seat and the cushion members which would be loosely positioned on the animal to perfectly follows it movements and adapt to its anatomy. However, the saddle must somehow be kept generally in position on the animal and needs to be mounted somehow. This is why the frame is still part of the design. However, in contrast to conventional saddle trees, in the saddle according to the present invention the parts of the saddle supporting the rider on the animal, i.e. the cushion members, in use, are separated from the relatively rigid frame. In particular, the cushion members are free to move and adapt in accordance with the anatomy of the animal as it moves. Because most of the weight of the rider is transferred onto the animal via the cushion members, the weight can be distributed more evenly, i.e. with less pressure points. The saddle according to the present invention can thus be significantly more comfortable for both animal and rider. Moreover, because of the more direct and adaptive contact between rider and animal, the rider can be seated in a more stable manner and there can receive considerably more feedback from the animal and its movements to the rider and vice versa. The seat may be provided as part of the saddle, or it may be provided separately. Either way, the cushion members function in the way as previously described to support said seat, when combined with the rest of the saddle, in the position or at the level as previously described.

In the context of the present invention, the term 'freely' is to be construed as a movement or rotation of the connecting element in any direction towards, away from or around the central member. Obviously, the connecting element can not move through the central member. Also, the movement of the connecting element is restricted by other parts of the saddle. However, considered solely with respect to the central member, i.e. when the central member and the connecting element are taken in isolation, the connecting element would essentially be freely movable in any direction relative to said central member. Similarly, 'loose' is to be construed as loose with respect to the central member when the connecting element and the central member are taken in isolation. The connecting element may be indirectly connected to the central member, whereas in itself it is loose with respect to the central member.

Preferably, the first cushion member and the second cushion member are loose with respect to the frame. Hence, when the cushion members, the connecting element and the frame are isolated from the rest of the saddle, the cushion members are movable in any direction towards, away and around the frame. This provides the cushion members with optimal freedom of movement to follow the anatomy of the animal as it moves.

In a further embodiment the connecting element extends over the central member. Hence, the connecting member can be lifted at least partially from the central member to freely move relative to said central member with less friction or without any contact.

In another embodiment the connecting element is flexible, preferably wherein the connecting element is a connecting strap. The flexible connecting element does not restrict the movement of the cushion members in a flexing direction, i.e. when rotating the cushion members about a rotation axis relative to said flexible connecting element.

In another embodiment the first cushion member and the second cushion member are independently movable relative to each other. Hence, each cushion member can adapt to anatomy of the animal as it moves independently and thus assume the best possible position, thereby significantly increasing the comfort of the animal.

In another embodiment the first cushion member and the second cushion member are independently movable relative to each other in a height direction perpendicular to the longitudinal direction and the lateral direction. In other words, the cushion members can be moved upwards with at least a vector component of its movement parallel to the height direction. This allows for the cushion members to be raised or lifted to a level above the central member of the frame.

In another embodiment the first cushion member and the second cushion member are independently rotatable relative to each other about a rotation axis parallel to the longitudinal direction. The cushion members can thus adapt to animals of different shapes and sizes, i.e. having high or low withers and/or having wide or narrow shoulders, thereby increasing the size range of animals to which the saddle can be fitted. More in particular, because of the absence of the side frame members of the prior art saddle, there is virtually no restriction as to the width of the animal.

In another embodiment the first cushion member and the second cushion member, when resting on the back of the animal, at least partially lift the connecting element from the central member. Preferably, the first cushion member and the second cushion member, when resting on the back of the animal, lift the connecting element from the central member completely. Hence, when a rider is seated on the saddle, i.e. on a seat that is supported by said cushion members, the cushion members may support the rider in a position above and/or clear off the central member. Consequently, the rider would not feel the central member. Moreover, most of the weight of the rider would be transmitted to the animal via the cushion members and the weight can be distributed more evenly.

In another embodiment the first cushion member and the second cushion member, when resting on the back of the animal, extend in a height direction perpendicular to the longitudinal direction and the lateral direction to a cushion height above the central member. Again, this allows the seat to be supported on the cushion members at a level above the central member and allows for a connection of the connecting element to the cushion members in a position that is at a level above the central member.

In another embodiment the saddle further comprises rear support pads for supporting the rear member on the back of the animal, wherein the first cushion member and the second cushion member are directly adjacent to or form a continuation of the rear support pads in the longitudinal direction. Hence, seat can be supported on both the cushion members as well as the rear support pads, thereby increasing the effective length of the seating area in the longitudinal direction. In contrast, the seating area in the prior art saddle is limited to the area within the frame, which is restricted in both the lateral direction as well as the longitudinal direction. By having a larger seating area, the weight of the rider can be distributed over a large surface area, thereby reducing the weight per unit of the surface area. The transition of cushion members to their respective rear support pads is preferably made as smooth as possible, to prevent the rider or the animal from noticing or experiencing discomfort as a result of said transition.

Preferably, the saddle further comprises a common sheathing for each pair of one of the first cushion member and the second cushion member and one of the rear support pads. The common sheathing can further smoothen the transition from the cushion members to their respective rear support pads, in particular when the cushion members are moved relative to the frame while the rear support pads are connected more rigidly to the frame and tend to remain substantially in the same position.

In yet another embodiment the saddle further comprises front support pads for supporting the front member alongside the withers of the animal, wherein the front support pads are pivotable with respect to the front member. The front support pads can thus be positioned in the most optimal position alongside the withers of the animal to support the front member of the frame in a position clear of the spine, wherein the saddle further comprises a seat for placement on top of the first cushion member and the second cushion member, wherein the first cushion member and the second cushion member, when resting on the back of the animal, supports the seat in a position above and/or clear off the central member.

According to a second aspect, the invention provides a use of a saddle according to any one of the previously described embodiments for seating a rider on an animal, in particular a horse.

The use of the aforementioned saddle has the same technical advantages, which will not be described hereafter for reasons of conciseness.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-5 show a saddle 1, in particular a horse riding saddle, for seating a rider on an animal, in particular on an equine or a horse H.

Figure 1:
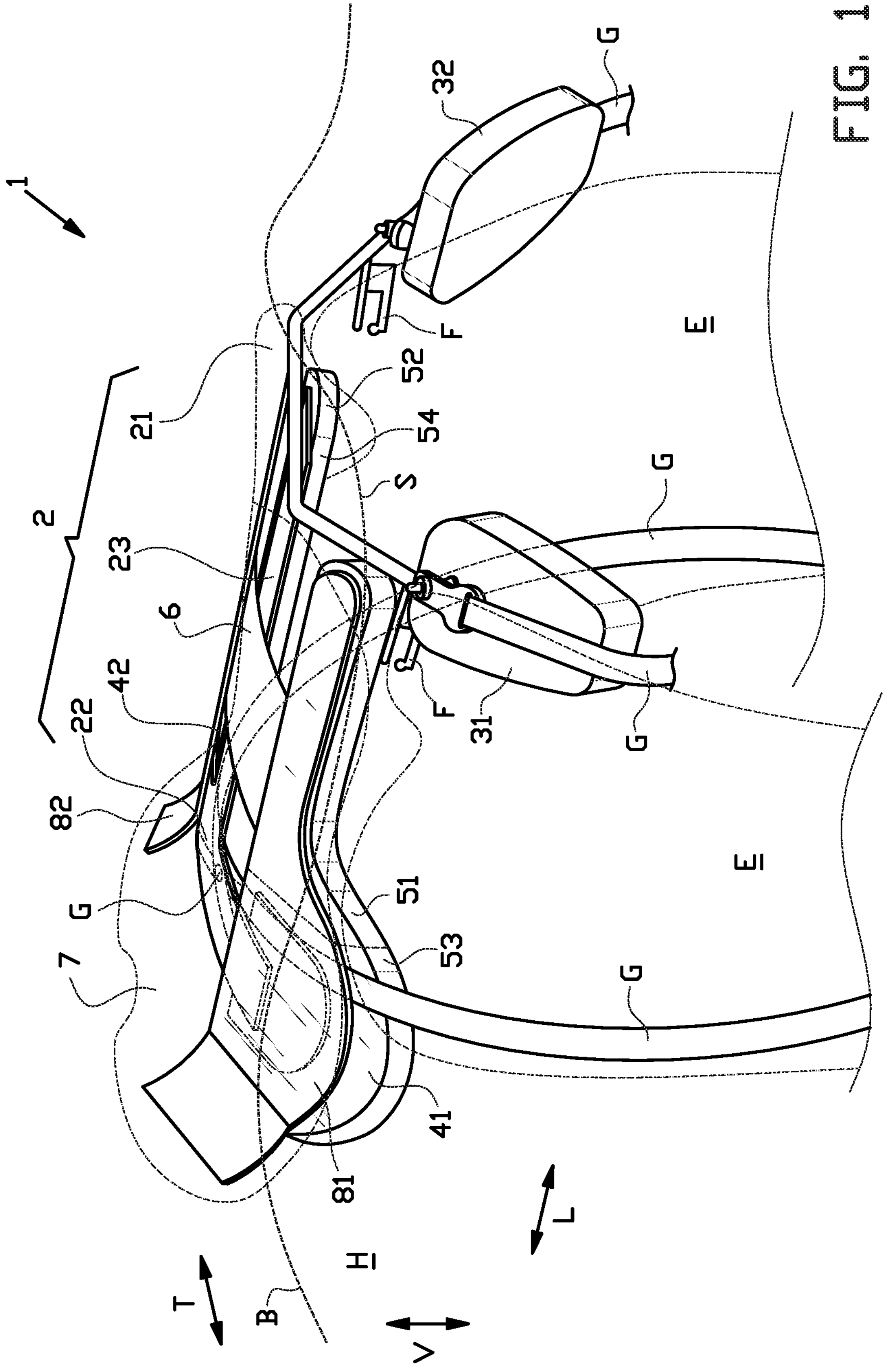
FIG. 1 shows an isometric view of a saddle according to the present invention.

As best seen in FIG. 1, the saddle 1 comprises a frame 2 for mounting stirrups and/or girths G. In use, the girths G cross each other over the frame 2 and pass under the barrel of the animal. The girts G are connected to the frame 2 where they cross each other. The girths G keep the saddle 1 in place on the animal. The frame 2 is provided with two stirrup hooks F for mounting the stirrups. The saddle 1 further comprises a seat 7 extending above the frame 2 in a manner that will be described in more detail hereafter and flaps E that are arranged to extend downwards from the seat 7 alongside the flanks of the animal. The seat 7 and the flaps E are shown in dashed lines in some of the drawings for simplicity.

Figure 2:
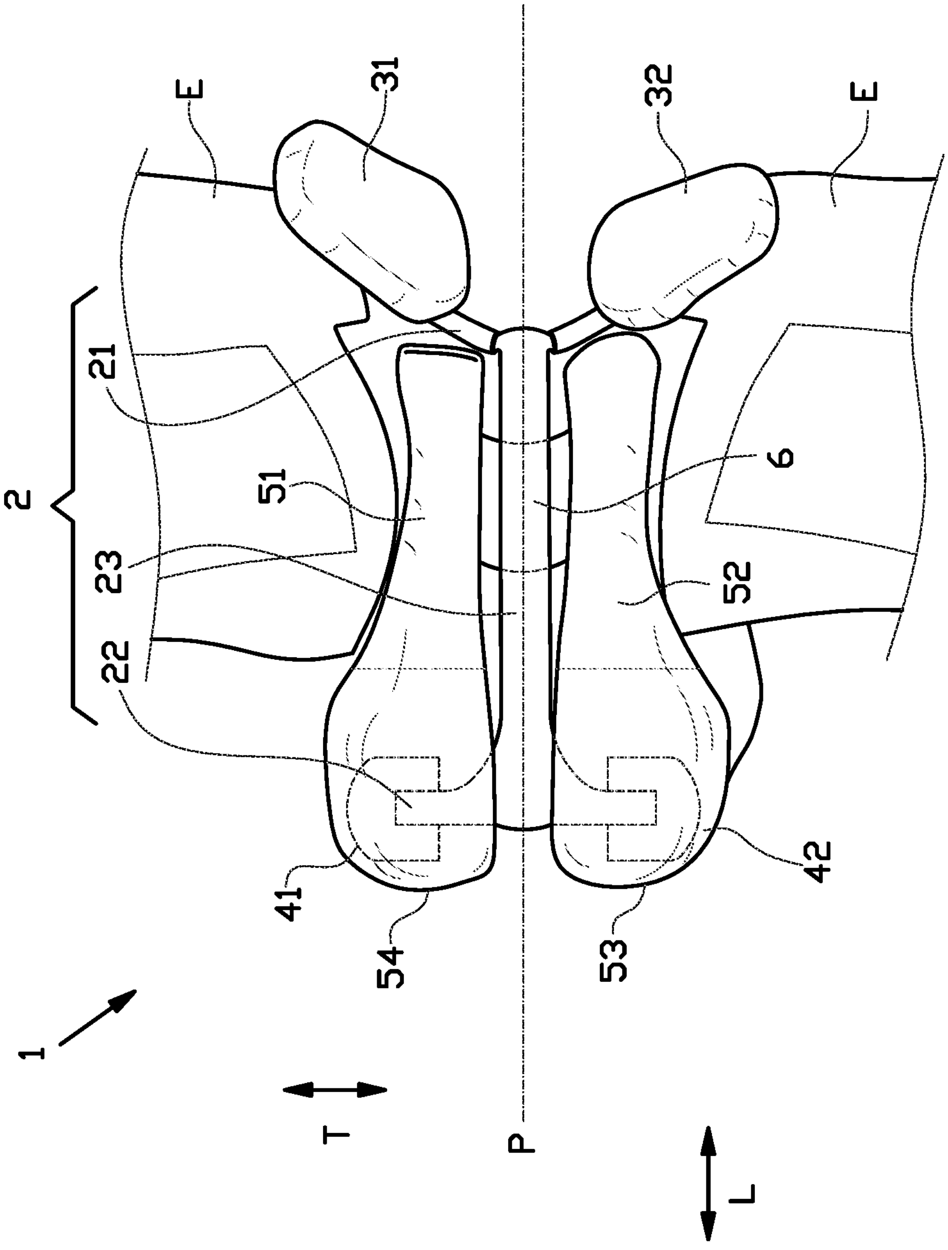
FIG. 2 shows a bottom view of the saddle according to FIG. 1.

As shown in FIG. 2, the saddle 1 further comprises front support pads 31, 32 and rear support pads 41, 42 for supporting the frame 2 on the animal such that the frame 2 stays clear off the spine S or the back B of the animal. In other words, the support pads 31, 32, 41, 42 lift the frame 1 into a position above and/or spaced apart from the animal. The front support pads 31, 32 are arranged for resting on the back B and/or flanks of the animal on opposite sides of the spine S, more specifically alongside the withers and/or the shoulders of said animal. The rear support pads 41, 42 are arranged for resting on opposite sides of the spine S on the back B and/or the flanks of the animal towards the rear of the animal with respect to the front support pads 31, 32. The support pads 31, 32, 41, 42 are made from a soft, compressible material that can adapt to the shape and/or anatomy of the animal as it moves. Preferably, at least the front support pads 31, 32 are pivotably connected to the frame 2 in a manner known per se, to allow for pivoting or swiveling of the support pads 31, 32, 41, 42 into an orientation that best fits the anatomy of the animal.

Figure 3:
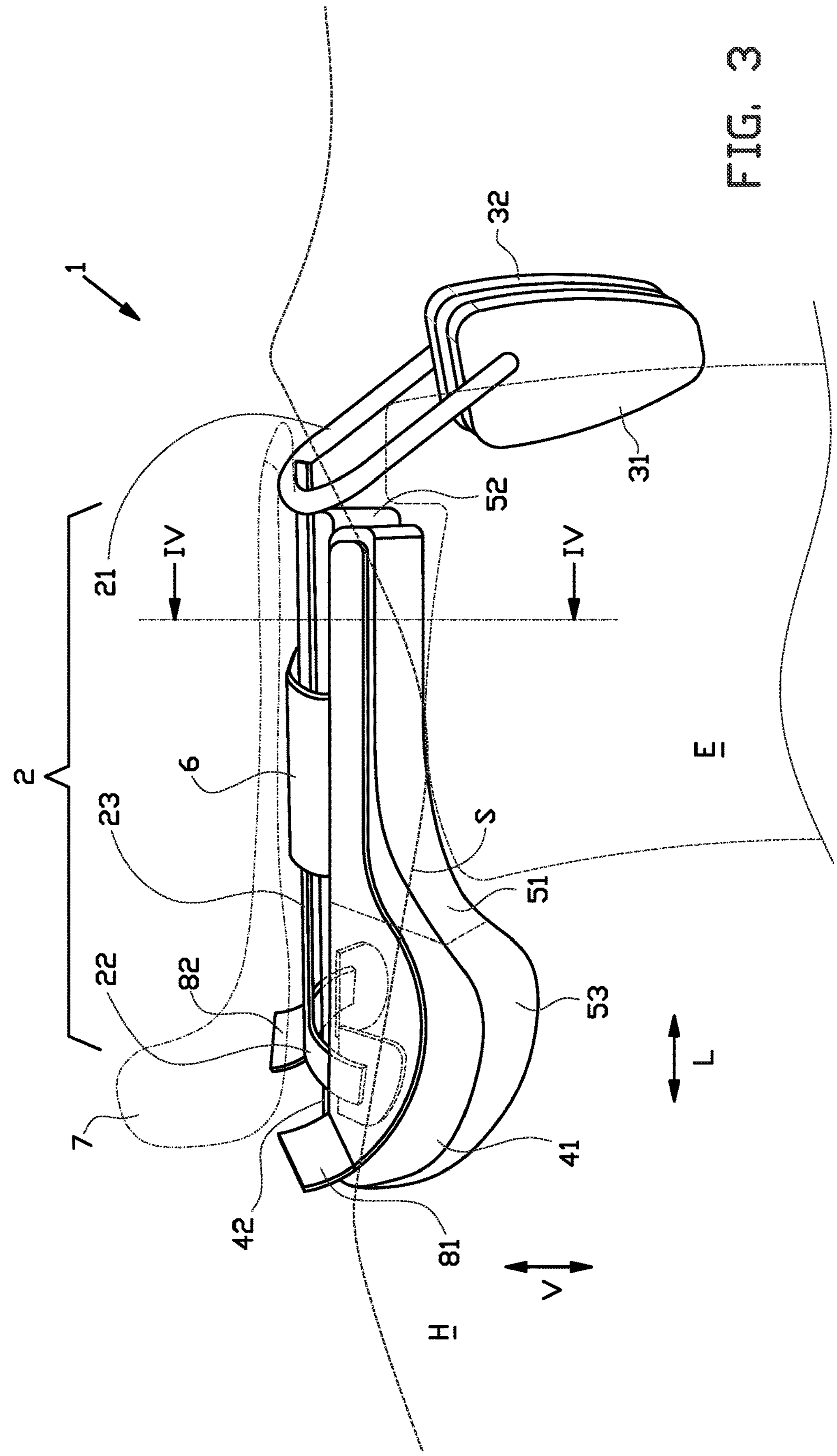
FIG. 3 shows a side view of the saddle according to FIG. 1, fitted to the back of a horse.

As shown in FIG. 3, the frame 2 comprises a front member 21 that defines a pommel side of the saddle 1 and a rear member 22 that defines a cantle side of the saddle 1. The saddle 1 has a longitudinal direction L between the pommel side and the cantle side and a lateral direction T perpendicular to said longitudinal direction L. The longitudinal direction L, in use extends, parallel or substantially parallel to the sagittal plane P of the animal, i.e. the plane in which the spine S or spinal column of the animal extends. The front member 21 extends over the spine S of the animal in the lateral direction T and interconnects the front support pads 31, 32 on opposite sides of the spine S. The rear member 22 extends over the spine S of the animal in the lateral direction T and interconnects the rear support pads 41, 42 on opposite sides of the spine S. The rear member 22 may be deformable to allow for some flexing of the rear support pads 41, 42, mainly or predominantly in a rotation direction about a rotation axis parallel to the longitudinal direction L.

The frame 1 further comprises a central member 23 interconnecting the front member 21 and the rear member 22. In other words, the front member 21 and the rear member 22 are connected to and/or fixed to the central member 23 to form the frame 2. The central member 23 is arranged to extend in or parallel to the longitudinal direction L above and/or spaced apart from the spine S of the animal. Moreover, the central member 23 extends at a height below and/or spaced apart from the seat 7. The central member 23 is relatively rigid. The central member 23 may for example be made from a rigid metal, i.e. steel. The central member 23 may be bar-shaped, tube-shaped, strip-shaped or any other shape that can rigidly interconnect the front member 21 with the rear member 22. The central member 23 extends through a central area of the saddle 1, i.e. in a central region considered in the lateral direction T. In particular, the central member 23 in use extends parallel to, in close proximity to or coincides with the sagittal plane P of the animal.

As best seen in FIG. 2, the saddle 1 further comprises a first cushion member 51 and a second cushion member 52 arranged for resting directly on the back B of the animal on opposite sides of the central member 23 and/or the spine S in the lateral direction T. The cushion members 51, 52 are arranged in the longitudinal direction L between the front support pads 31, 32 and the rear support pads 41, 42. The cushion members 51, 52 are directly adjacent to or form a continuation of the rear support pads 41, 42 in the longitudinal direction L. In particular, the saddle 1 comprises a common sheathing 53, 54, i.e. a leather enclosure, for each pair of one of the first cushion member 51 and the second cushion member 52 and one of the rear support pads 41, 42. Thus, from the outside, the first cushion member 51 and the first rear support pad 41 may appear as a single element. However, inside of the common sheathing 53, they are distinct or separate elements, as reflected by the dashed separation lines in the drawings, best seen in FIG. 2. Moreover, the rear support pads 41, 42 are directly connected to the rear member 22 of the frame 2, whereas the cushion members 51, 52 are free to move relative to the rear member 22. More in particular, the cushion members 51, 52 are loose relative to the frame 2, and in particular relative to the central member 23.

Figure 4B:
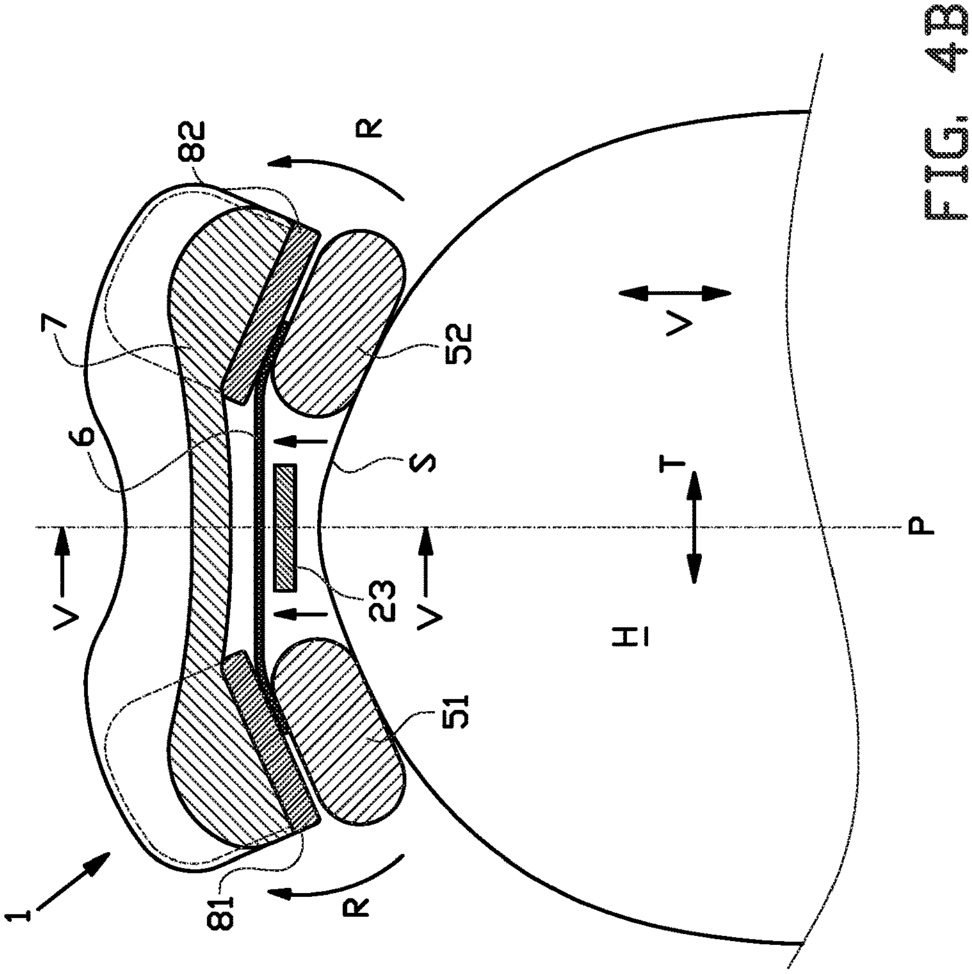
FIGS. 4A and 4B show cross section of the saddle according to the line IV-IV in FIG. 3, in an unfitted state and a fitted state, respectively.

The cushion members 51, 52, like the support pads 31, 32, 41, 42, are made from a soft, compressible material that can adapt to the anatomy of the animal as it moves. As shown in FIG. 4B, the cushion members 51, 52, when resting on the back B of the animal, extend in the height direction V perpendicular to the longitudinal direction and the lateral direction to a cushion height which is higher than or above the central member 23.

Figure 4A:
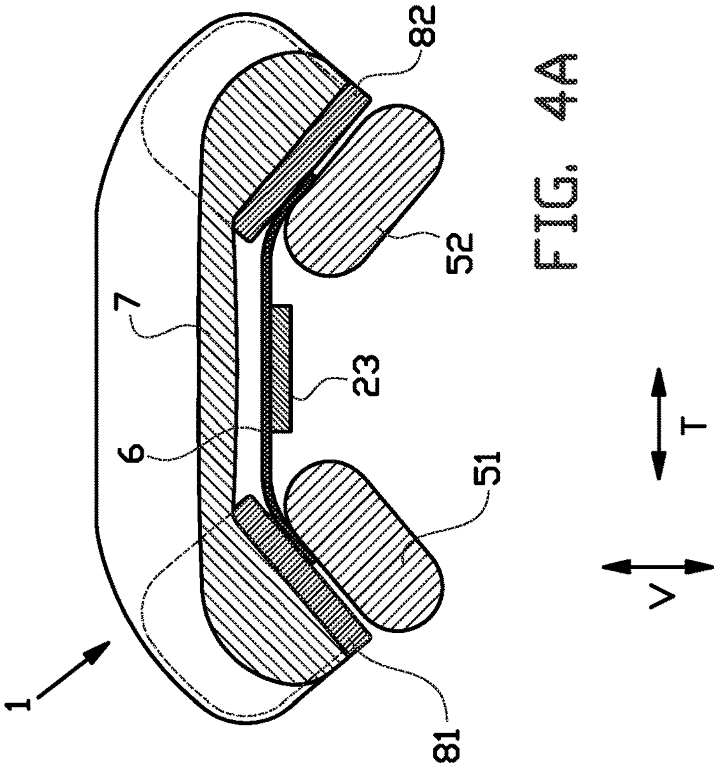

As shown in FIGS. 4A and 4B, the cushion members 51, 52 are tiltable, swivable or rotatable relative to each other about a rotation axis parallel to the longitudinal direction L, as reflected by the arrows R in FIG. 4B. The cushion members 51, 52 are independently movable relative to each other. In particular, when the cushion members 51, 52 are rotated, they can independently move relative to each other with at least a vector component in a height direction V perpendicular to the longitudinal direction L and the lateral direction T. Note that the height direction V is predominantly vertical. As such, the cushion members 51, 52 can adapt to the anatomy of the animal as it moves.

As shown in FIG. 1, the saddle 1 is provided with a connecting element, in particular in the form of a connecting strap 6, extending across or crossing the central member 23. The connecting strap 6 interconnects the first cushion member 51 and the second cushion member 52 across the central member 23. The connecting strap 6 is flexible and may for example be made from a textile or leather material. The connecting strap 6 may be stitched glued or connecting in another suitable way to the cushion members 51, 52, while maintaining the flexibility. In this exemplary embodiment, the connecting strap 6 extends over the central member 23. Alternatively, the connecting strap 6 may extend underneath the central member 23.

The connecting strap 6 is freely movable with respect to the central member 23 in the lateral direction T, the longitudinal direction L, in the height direction V and/or in a rotation about a rotation axis (not shown) parallel or substantially parallel to any one of said directions T, L, V. In the context of the present invention, the term 'freely' is to be construed as a movement or rotation of the connecting strap 6 in one or more of the aforementioned directions, or generally in any direction, towards, away from or around the central member 23. Obviously, the connecting strap 6 can not move through the central member 23. Also, the movement of the connecting strap 6 is restricted by other parts of the saddle 1, such as the cushion members 51, 52 being sandwiched between the seat 7 and the animal. However, considered solely with respect to the central member 23, i.e. when the central member 23 and the connecting strap 6 are taken in isolation, the connecting strap 6 would essentially be freely movable in any direction relative to said central member 23. Similarly, 'loose' is to be construed as loose with respect to the central member 23 when the connecting strap 6 and the central member 23 are taken in isolation. The connecting strap 6 may be indirectly connected to the central member 23, i.e. via the cushion members 51, 52 and their indirect connection to the frame 2 because of their proximity to the rear support pads 41, 42. However, the connecting strap 6 by itself is loose with respect to the central member 23.

Figure 5:
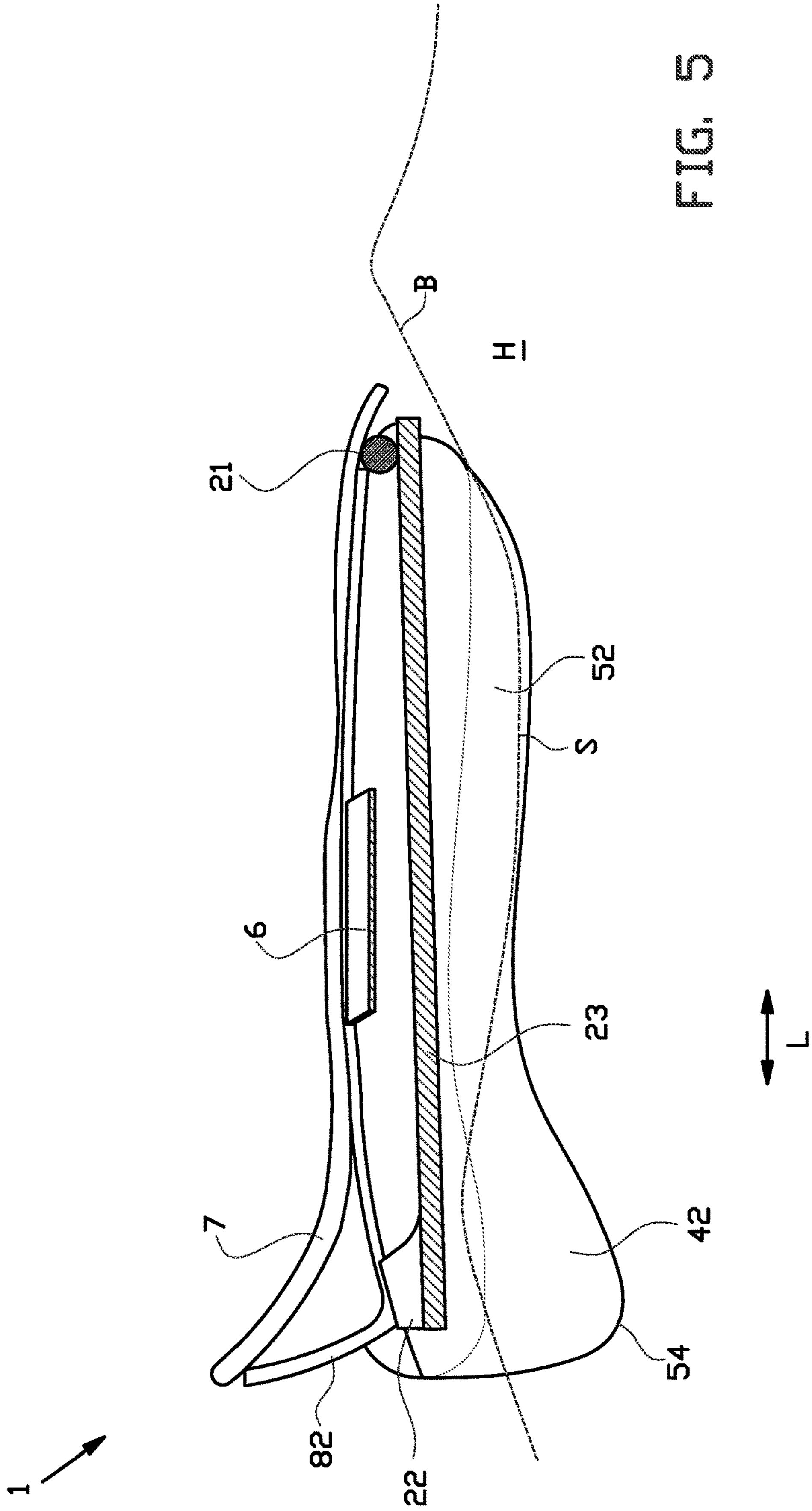
FIG. 5 shows a cross section of the saddle according to the line V-V in FIG. 4B.

Alternatively formulated, the connecting strap 6 is loose with respect to or from the central member 23, as best seen in FIG. 5. In other words, there is no direct fixation or direct connection between the connecting strap 6 and the central member 23.

The freedom of movement and/or the looseness allows the connecting strap 6 to be moved or lifted clear off the central member 23 in the height direction V. In the lifted state, the connecting strap 6 the cushion members 51, 52 are merely held together or solely connected by the connecting strap 6 across the central member 23, such that the movement of the connecting strap 6 and/or the cushion members 51, 52 are free relative to said central member 23 and/or the frame 2. In particular, the cushion members 51, 52 may rotate, translate, swivel, pivot, skew, twist and/or deform freely in any direction in response to the movements of the animal.

It can be observed in FIG. 4B, that the cushion members 51, 52, when resting on the back B of the animal, are tilted and/or rotated upwards, thereby at least partially lifting the connecting strap 6 from the central member 23. Preferably, the connecting strap 6 is lifted completely clear of the central member 23.

As best seen in FIG. 5, the seat 7 is supported by or placed on top of the first cushion member 51 and the second cushion member 52. The seat 7 extends between the front member 21 and the rear member 22 of the frame 2. The seat 7 may be connected to the frame 2 at or near the front member 21 and the rear member 22 to form a pommel and a cantle, respectively. The saddle 1 may optionally be provided with some pressure distribution elements 81, 82, i.e. in the form of a rigid or relatively rigid layer extending between the seat 7 and the cushion members 51, 52. The relatively rigid pressure distribution elements 81, 82 can distribute the weight of the rider over the entire length of the saddle 1. The pressure distribution elements 81, 82 lie loosely on the cushion members 51, 52 and may be covered with a foam layer for the comfort of the rider. At the cantle side of the saddle 1, the pressure distribution elements 81, 82 may point upwards to support the seat 7 in a higher position relative to the frame 2. The pressure distribution elements 81, 82 preferably remain separated on opposite sides of the central member 23 to provide optimal flexibility to the cushion members 51, 52 underneath.

The first cushion member 51 and the second cushion member 52, when resting on the back B of the animal, are arranged for supporting the seat 7 in a position above, spaced apart from and/or clear off the central member 23, as best shown in FIG. 4B. In other words; the seat 7 may rest on the central member 23 when carrying the saddle 1 by the frame 2 with the cushion members 51, 52 unsupported, i.e. in the position as shown in FIG. 4A, but when the saddle 1 is placed on the animal, the cushion members 51, 52 rotate or pivot upwards with at least a vector component in the height direction V to lift the seat 7 clear off the central member 23. Consequently, the rider can sit, via the seat 7 and the cushion members 51, 52 on the horse without feeling the presence of the central member 23.

In an ideal situation, the saddle 1 according to the present invention would only consist of the seat 7 and the cushion members 51, 52 which would be loosely positioned on the animal to perfectly follows it movements and adapt to its anatomy. However, the saddle 1 must somehow be kept generally in position on the animal and needs to be mounted somehow. This is why the frame 2 is still part of the design. However, in contrast to conventional saddle trees, in the saddle 1 according to the present invention the support of the seat 7 on the animal, via the cushion members 51, 52, in use, is separated from the relatively rigid frame 2. In particular, the cushion members 51, 52, and thus the seat 7 supported thereon, are free to move and adapt in accordance with the anatomy of the animal as it moves. Because most of the weight of the rider is transferred onto the animal via the cushion members 51, 52, less weight is exerted onto the animal via the frame 2. The saddle 1 according to the present invention is thus significantly more comfortable for both animal and rider. Moreover, because of the more direct and adaptive contact between rider and animal via the seat 7 and the cushion members 51, 52, the rider can be seated in a more stable manner and receive considerably more feedback from the animal and its movements.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A saddle for seating a rider on an animal, the saddle comprising a frame for mounting a girth or stirrups,
  wherein the frame comprises a front member that defines a pommel side of the saddle, a rear member that defines a cantle side of the saddle and a central member interconnecting the front member and the rear member,
  wherein the central member is arranged to extend in a longitudinal direction above a spine of the animal,
  wherein the saddle further comprises a first cushion member and a second cushion member arranged for resting directly on a back of the animal on opposite sides of the central member in a lateral direction perpendicular to the longitudinal direction,
  wherein the saddle is provided with a connecting element crossing over the central member and interconnecting the first cushion member and the second cushion member,
  wherein the connecting element is movable with respect to the central member,
  wherein the saddle further comprises a seat for placement on top of the first cushion member and the second cushion member,
  wherein, when not in use on the back of the animal, the connecting element rests directly on top of the central member,
  wherein the first cushion member and the second cushion member, when resting on the back of the animal, are configured to at least partially lift the connecting element from the central member,
  wherein the first cushion member and the second cushion member, when resting on the back of the animal, are arranged for supporting the seat in a position above the central member.

2. The saddle according to claim 1, wherein there is no direct fixation or direct connection between the connecting element and the central member.

3. The saddle according to claim 1, wherein there is no direct fixation or direct connection between the frame and each of the first cushion member and the second cushion member.

4. The saddle according to claim 1, wherein the connecting element extends over the central member.

5. The saddle according to claim 4, wherein the connecting element is flexible, and wherein the connecting element is a connecting strap.

6. The saddle according to claim 1, wherein the first cushion member and the second cushion member are independently movable relative to each other.

7. The saddle according to claim 1, wherein the first cushion member and the second cushion member are independently movable relative to each other in a height direction perpendicular to the longitudinal direction and the lateral direction.

8. The saddle according to claim 1, wherein the first cushion member and the second cushion member are independently rotatable relative to each other about a rotation axis parallel to the longitudinal direction.

9. The saddle according to claim 1, wherein the first cushion member and the second cushion member, when resting on the back of the animal, are configured to lift the connecting element from the central member completely.

10. The saddle according to claim 1, wherein the first cushion member and the second cushion member, when resting on the back of the animal, are configured to extend in a height direction perpendicular to the longitudinal direction and the lateral direction to a cushion height above the central member.

11. The saddle according to claim 1, wherein the saddle further comprises rear support pads for supporting the rear member on the back of the animal, wherein the first cushion member and the second cushion member are directly adjacent to or form a continuation of the rear support pads in the longitudinal direction.

12. The saddle according to claim 11, wherein the saddle further comprises a common sheathing for each pair of one of the first cushion member and the second cushion member and one of the rear support pads.

13. The saddle according to claim 1, wherein the saddle further comprises front support pads for supporting the front member alongside a withers of the animal, wherein the front support pads are pivotable with respect to the front member.

14. The saddle of claim 1, wherein the first cushion member and the second cushion member, when resting on the back of the animal, are arranged for supporting the seat in a position clear off the central member.

15. A method for seating a rider on an animal, the method comprising:

providing a saddle according to claim 1; and arranging the saddle on the animal.

16. The method according to claim 15, wherein the animal is a horse.

17. A saddle for seating a rider on an animal, the saddle comprising a frame for mounting a girth or stirrups, wherein the frame comprises a front member that defines a pommel side of the saddle, a rear member that defines a cantle side of the saddle and a central member interconnecting the front member and the rear member, wherein the central member is arranged to extend in a longitudinal direction above a spine of the animal, wherein the saddle further comprises a first cushion member and a second cushion member arranged for resting directly on a back of the animal on opposite sides of the central member in a lateral direction perpendicular to the longitudinal direction, wherein the saddle is provided with a connecting element crossing over the central member and interconnecting the first cushion member and the second cushion member, wherein the connecting element is movable with respect to the central member, wherein the saddle further comprises a seat for placement on top of the first cushion member and the second cushion member, wherein, when not in use on the back of the animal, the connecting element rests directly on top of the central member, wherein the first cushion member and the second cushion member, when resting on the back of the animal, are configured to at least partially lift the connecting element from the central member, wherein the first cushion member and the second cushion member, when resting on the back of the animal, are arranged for supporting the seat in a position clear off the central member.

* * * * *